US009176227B2

(12) United States Patent
Bergeron et al.

(10) Patent No.: US 9,176,227 B2
(45) Date of Patent: Nov. 3, 2015

(54) METHOD AND APPARATUS FOR COMPENSATING FOR A PARAMETER CHANGE IN A SYNTHETIC APERTURE IMAGING SYSTEM

(75) Inventors: Alain Bergeron, Chemin Saint-Louis (CA); Linda Marchese, Côte de Cap-Rouge (CA)

(73) Assignee: INSTITUTE NATIONAL D'OPTIQUE, Quebec (CA)

( * ) Notice: Subject to any disclaimer, the term of this patent is extended or adjusted under 35 U.S.C. 154(b) by 727 days.

(21) Appl. No.: 12/933,005

(22) PCT Filed: Jun. 28, 2010

(86) PCT No.: PCT/CA2010/001008
§ 371 (c)(1),
(2), (4) Date: May 15, 2012

(87) PCT Pub. No.: WO2012/000074
PCT Pub. Date: Jan. 5, 2012

(65) Prior Publication Data
US 2012/0218140 A1    Aug. 30, 2012

(51) Int. Cl.
*G01S 13/90* (2006.01)
*G01S 7/40* (2006.01)
*G02B 27/58* (2006.01)
*G06T 5/50* (2006.01)
*G03H 1/04* (2006.01)
*G01S 17/89* (2006.01)

(52) U.S. Cl.
CPC ............ *G01S 13/9035* (2013.01); *G01S 7/4004* (2013.01); *G01S 13/9005* (2013.01); *G01S 17/895* (2013.01); *G02B 27/58* (2013.01); *G03H 2001/046* (2013.01); *G06T 5/50* (2013.01)

(58) Field of Classification Search
CPC .............. G01S 13/9035; G01S 7/4004; G01S 13/9005; G01S 17/895; G03H 2001/046; G06T 5/50; G02B 27/58
See application file for complete search history.

(56) References Cited

U.S. PATENT DOCUMENTS

| 4,071,907 A |   | 1/1978 | Casasent |
| 4,084,158 A | * | 4/1978 | Slawsby ...................... 342/25 F |
| 4,108,538 A | * | 8/1978 | Felstead ...................... 359/564 |

(Continued)

FOREIGN PATENT DOCUMENTS

WO    2006072813    7/2006

OTHER PUBLICATIONS

H. Breit and Al., "Processing of TerraSAR-X payload data : first results", Proceedings of SPIE, vol. 6746, Oct. 3, 2007, pp. 674603-1 to 674603-12, XP055116411, ISSN : 0277-786X, DOI : 10.1117/12. 738066.

(Continued)

*Primary Examiner* — Matthew M Barker
(74) *Attorney, Agent, or Firm* — Norton Rose Fulbright Canada LLP; Alexandre Daoust (57) ABSTRACT

There is described a method for processing data generated by a synthetic aperture imaging system, comprising: receiving raw data representative of electromagnetic signals reflected by a target area to be imaged; receiving a parameter change for the synthetic aperture imaging system; digitally correcting the raw data in accordance with the parameter change, thereby compensating for the parameter change in order to obtain corrected data; and generating an image of the target area using the corrected data.

8 Claims, 4 Drawing Sheets

(56) References Cited

U.S. PATENT DOCUMENTS

| | | | | |
|---|---|---|---|---|
| 4,246,580 A * | 1/1981 | Caputi, Jr. | | 342/25 F |
| 4,963,877 A * | 10/1990 | Wood et al. | | 342/25 A |
| 5,045,855 A * | 9/1991 | Moreira | | 342/25 A |
| 5,160,931 A * | 11/1992 | Brown | | 342/25 C |
| 5,260,708 A * | 11/1993 | Auterman | | 342/25 C |
| 5,659,318 A * | 8/1997 | Madsen et al. | | 342/25 C |
| 6,005,509 A * | 12/1999 | Buckreuss | | 342/25 F |
| 6,970,128 B1 * | 11/2005 | Dwelly et al. | | 342/25 F |
| 6,987,479 B1 | 1/2006 | Hansen et al. | | |
| 7,728,757 B2 | 6/2010 | Cho | | |
| 8,125,370 B1 * | 2/2012 | Rogers et al. | | 342/25 F |
| 8,384,583 B2 * | 2/2013 | Leva et al. | | 342/25 C |
| 2008/0084551 A1 | 4/2008 | Harnisch | | |
| 2010/0109938 A1 | 5/2010 | Oswald et al. | | |

OTHER PUBLICATIONS

Josef Mittermayer and Al., "Spotlight SAR Data Processing Using the Frequency Scaling Algorithm", IEEE Transactions on Geoscience and Remote Sensing, vol. 37, No. 5, Sep. 1, 1999, XP011021386, ISSN : 0196-2892.

Adriano Meta and Al., "Signal Processing for FMCW SAR", IEEE Transactions on Geoscience and Remote Sensing, vol. 45, No. 11, Nov. 1, 2007, pp. 3519-3532, XPO11196209, ISSN : 0196-2892, DOI: 10.1109/TGRS.2007.906140.

Zhi-Hong Jiang and Al., "A Chirp Transform Algorithm for Processing Squint Mode FMCW SAR Data", IEEE Transactions on Geoscience and Remote Sensing, vol. 4, No. 3, Jul. 1, 2007, pp. 377-381, ISSN: 1545-598X, DOI : 101109/LGRS.2007.895689, XPO11187251.

Pascal Bourqui and Al., "Optical SAR processor for space applications", Proceedings of SPIE, vol. 6958, Apr. 3, 2008, pp. 69580J to 6950J-10, ISSN : 0277-786X, DOI : 10.1117/12.778047.

Graham L. C., "Synthetic Interferometer Radar for Topographic Mapping", Proceedings of IEEE 62, No. 2, Jun. 1974, 763-768.

Ouchi et al., "Cross-Track Proposed Multi-Frequency SAR Interferometry: Comparisons with Optical Holographic Interferometry", IEEE, vol. 4, Issue 8, Aug. 1994, pp. 2263-2266.

Leith, Emmet N., "Quasi-Holographic Techniques in the Microwave Region", Proceedings of the IEEE, vol. 59, No. 9, Sep. 1971, 1305-1323.

Kozma et al., "Tilted-plane optical processor", Applied Optics, vol. 11, No. 8, Aug. 1972, 1766-1777.

Leith E. N., "Range-azimuth-coupling aberrations in pulse-scanned imaging systems", Journal of the Optical Society of America, vol. 63, No. 2, Feb. 1973, 119-126.

Hecht, E., "Optics", Addison-Wesley, Co. 1987, 593-610.

Marchese et al., "A real-time high-resolution optical SAR processor", Proceedings of SPIE, vol. 7669,1-7, 2010.

Marchese et al., "Full scene SAR processing in seconds using a reconfigurable optronic processor", Proceedings of the IEEE,1362-1364, 2010.

Orsomando et al., "SAR and Optical Data Fusion for Change Detection", Urban Remote Sensing Joint Event, IEEE, 2007.

Olmsted, Coert, "Alaska SAR Facility Scientific SAR User's Guide", Jul. 1993, 1-53.

Bamler, Richard, "A Comparison of Range-Doppler and Wavenumber Domain SAR Focusing Algorithms", Proceedings of the IEEE, vol. 30, No. 4, Jul. 1992, 706-713.

Gough et al., "Unified Framework for Modern Synthetic Aperture Imaging Algorithms", John Wiley & Sons, Inc. 1997, 343-358, Jan. 1997.

International Search Report dated Mar. 14, 2011 issued by the International Bureau (WIPO) in connection with the corresponding International patent application No. PCT/CA2010/001008.

* cited by examiner

METHOD AND APPARATUS FOR COMPENSATING FOR A PARAMETER CHANGE IN A SYNTHETIC APERTURE IMAGING SYSTEM

CROSS-REFERENCE TO RELATED APPLICATIONS/PRIORITY CLAIM

This application is a national phase of PCT patent application serial number PCT/CA2010/001008 filed Jun. 28, 2010, designating the United States of America, now pending, the specification of which is hereby incorporated by reference.

TECHNICAL FIELD

The present invention relates to the field of synthetic aperture imaging systems, and more particularly to methods and apparatuses for compensating for a change of parameter in a synthetic aperture imaging system.

BACKGROUND

Synthetic aperture radar (SAR) imaging systems are widely used in aerial and space reconnaissance. Usually, an aircraft or a spacecraft is provided with a SAR imaging system which transmits radar pulses and collects radar echoes corresponding to the radar pulses reflected by an object to be imaged.

Due to the large amount of data generated by a SAR system, optical solutions have been developed for processing the SAR raw data. For example, the SAR raw data can be recorded on a photosensitive film, or an optical image of the SAR raw data can be generated using a light modulator. However, in such optical processing systems, the position of optical components has to be changed in order to compensate for parameters changes for the SAR imaging system, such as an altitude change for example. The requirement for moving the optical components reduces the sturdiness and viability for the optical SAR raw data processing system.

Therefore there is a need for an improved method and apparatus for compensating for a parameter change in a SAR imaging system.

SUMMARY

In accordance with a first broad aspect, there is provided a method for processing data generated by a synthetic aperture imaging system, comprising: receiving raw data representative of electromagnetic signals reflected by a target area to be imaged; receiving a parameter change for the synthetic aperture imaging system; digitally correcting the raw data in accordance with the parameter change, thereby compensating for the parameter change in order to obtain corrected data; and generating an image of the target area using the corrected data.

In accordance with a second broad aspect, there is provided a system for generating a synthetic aperture image of a target area, comprising: a memory for storing raw data representative of electromagnetic signals reflected by said target area and a parameter change for said synthetic aperture imaging system; a raw data correcting module adapted to correct said raw data in accordance with said parameter change in order compensate for said parameter change and obtain corrected data; and an image generator adapted to generate an image of said target area using said corrected data.

DESCRIPTION

Figure 1:
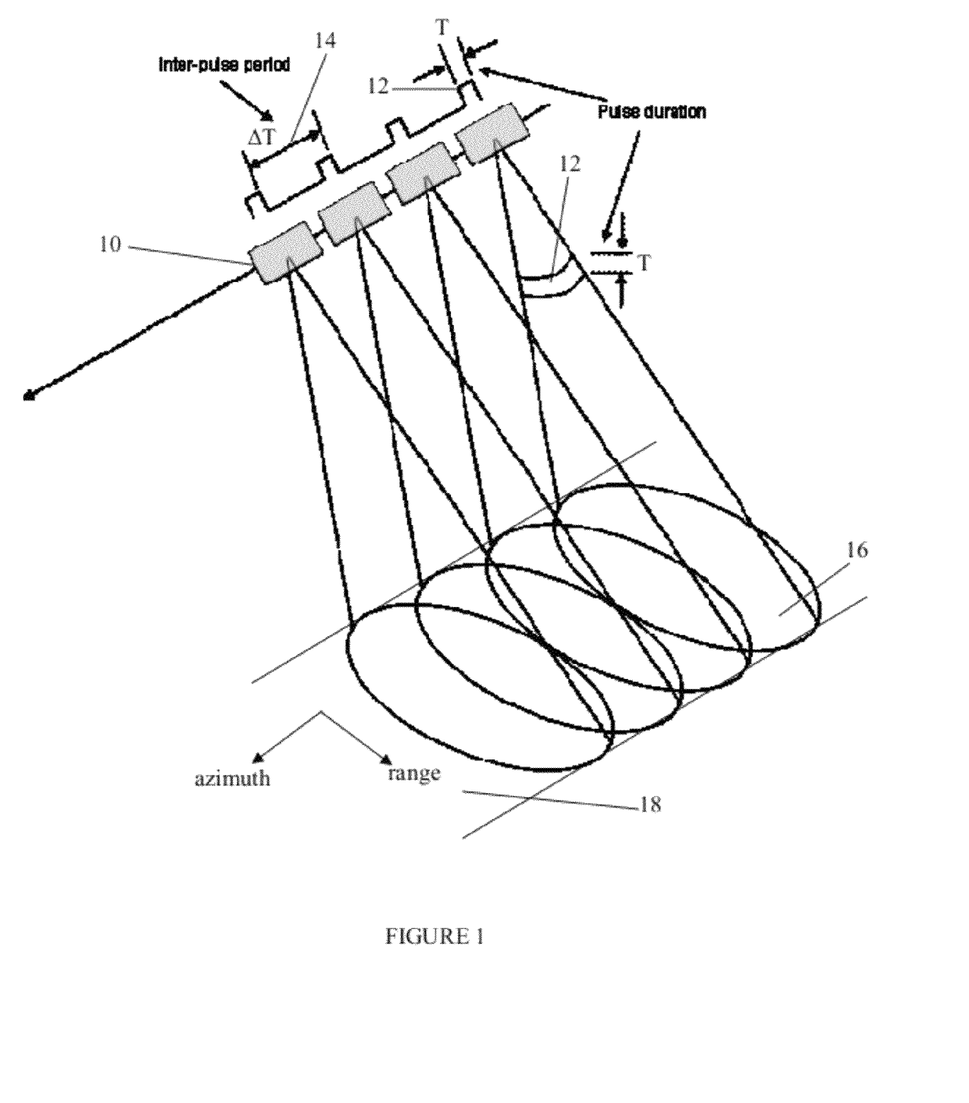
FIG. 1 illustrates a SAR imaging system for imaging a target area, in accordance with an embodiment.

FIG. 1 illustrates one embodiment of a satellite 10 provided with a SAR imaging system. The satellite 10 is in orbit around an object to be imaged, such as a planet for example. The satellite 10 is traveling along a satellite flight path while imaging the planet. The SAR imaging system is adapted to emit successive electromagnetic radar pulses 12 in direction of the planet. Each radar pulse 12 is characterized by a pulse duration T and two successive radar pulses 12 are temporally spaced apart by an inter-pulse duration $\Delta T$. The pulse duration T and the inter-pulse duration $\Delta T$ defines a pulse repetition frequency which corresponds to the repetition rate of the outgoing radar pulses 12. The emitted radar pulses 12 form a radar beam 14 which illuminates the target area to be imaged. The area of the planet ground which intersects the radar beam is referred to as the footprint 16 of the radar beam. While FIG. 1 illustrates an oval footprint 16, it should be understood that the footprint 16 may have other shape. For example, the footprint 16 may be round. While the satellite 10 is moving along the satellite flight path, the footprint 16 is moving, thereby defining a swath 18. The swath 18 is characterized by a length in an azimuth direction and a width in a range direction. The azimuth direction corresponds to the propagation direction of the radar beam 14, i.e. the flight path direction, and the range direction is the direction normal to the azimuth direction. When reaching the ground, the radar pulses 12 are reflected to give rise to radar echoes. The radar echoes are collected by the SAR system and processed in order to generate a radar image of the target area.

The SAR system mounted to the satellite 10 is provided with at least one emitting antenna for emitting the pulses 12. The emitting antenna can be used for detecting the radar echoes reflected by the ground. Alternatively, at least one receiving antenna different from the emitting antenna can be used for collecting the radar echoes.

A SAR image is generated by superposing a plurality of radar echoes within the range and azimuth of the SAR antenna footprint 16. The received echoes are converted into electrical signals which are referred to as SAR raw data. Alternatively, the electrical signals may be subsequently converted into digital data, which are also referred to as the SAR raw data. The SAR raw data is then processed to create the SAR image of the illuminated target area. A high resolution in the azimuth direction is achieved by applying SAR signal processing without requiring large antennas. The SAR signal processing allows synthesizing a large aperture antenna. SAR signal processing can be mathematically described as a correlation or a filtering process on all of the radar echoes received during an aperture time.

During operation of a SAR imaging system, at least one of the parameters of the SAR imaging system may vary. In order to generate an adequate image, a compensation for the parameter variation must be performed. Examples of SAR imaging system parameters which may vary comprise parameters of which a variation causes a Doppler shift, parameters of which a variation causes a variation of the Fresnel zone plate focal length, and the like. The Doppler shift refers to a shift of the Doppler centroid which is the center Doppler frequency or null of the Doppler spectrum as the radar beam sweeps past the target area. Because a graphical representation of SAR raw data can be thought of as an optical interference pattern, an interference pattern parameter can be defined. In the case of a stripmap SAR, a Fresnel zone plate may be defined and associated with SAR raw data, and the interference pattern parameter is a Fresnel zone plate focal length. For a spotlight SAR, a Fourier slice may be defined and associated with SAR raw data, and the interference pattern is a Fourier slice scale parameter. An example of a parameter of which a variation causes a Doppler shift is the squint angle which corresponds to the angle between the radar beam center and the normal to the flight path. Examples of a parameter of which a variation causes a variation of the interference pattern parameter, such as the Fresnel zone plate focal length or the Fourier slice scale parameter, are the pulse repetition frequency, the range sampling frequency, the slant range distance, and the like. The range sampling frequency or radar sampling frequency is defined as the number of pulses transmitted per second by the SAR system. The pulse repetition frequency is the frequency at which the SAR system samples the radar return signal (echo) from the ground. The slant range distance corresponds to the distance between the SAR radar system and the target area to be imaged.

Figure 2:
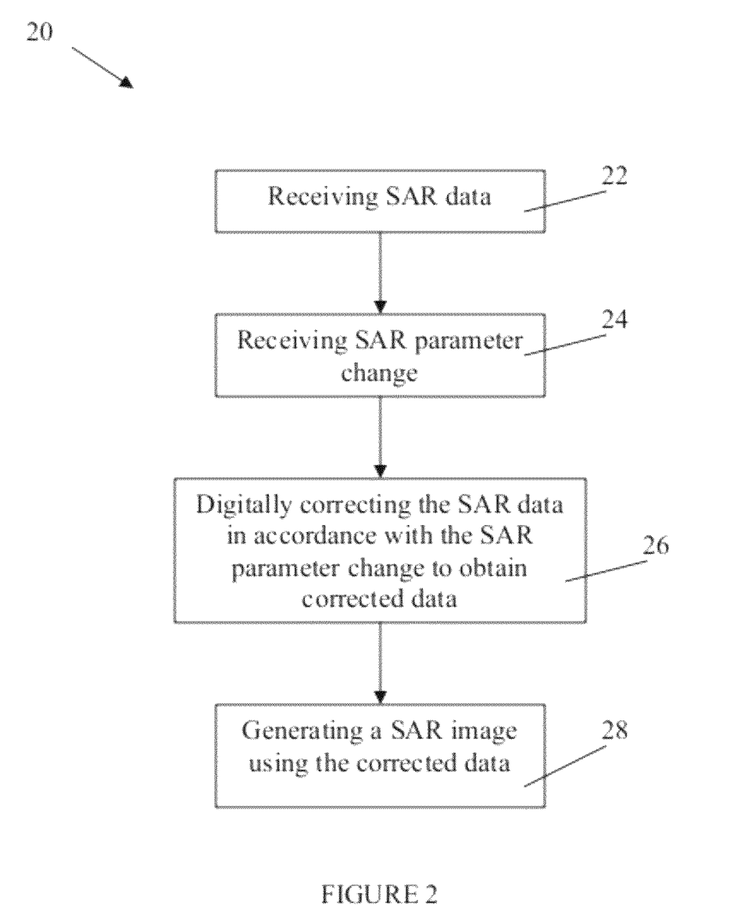
FIG. 2 is a flow chart illustrating a method for generating a SAR image in accordance with a SAR parameter change, in accordance with an embodiment.

FIG. 2 illustrates one embodiment of a method 20 for processing SAR raw data generated by a SAR imaging system in which compensation for a SAR imaging system parameter is digitally performed. The first step 22 comprises receiving SAR raw data. The SAR raw data is a digital representation of the echoes reflected by the target area to be imaged and received by the SAR system during a determined period of time. The SAR raw data comprises amplitude and phase information. The second step comprises receiving a parameter change for the SAR radar system that has been performed before the radar illumination of the target area to be imaged. The third step 26 of the method 20 comprises digitally correcting the SAR raw data in accordance with the SAR parameter change. By digitally correcting the SAR raw data, a compensation for the parameter change is performed onto the SAR raw data and corrected data is obtained. The last step 28 of the method 20 comprises generating a SAR image using the corrected data.

In one embodiment, the SAR parameter change received at step 24 causes a variation of the interference pattern parameter, such as the Fresnel zone plate focal length for a stripmap SAR or the Fourier slice scale parameter for a spotlight SAR, for example. Such a parameter change can be a change of the pulse repetition frequency, the range sampling frequency, the slant range distance, or the like. In this case, step 26 of digitally correcting the SAR raw data comprises determining a scaling factor in accordance with the interference pattern parameter change and applying the scaling factor to the SAR raw data, thereby obtaining the corrected data. Applying a scaling vector to the SAR raw data can be thought of as applying a translation vector to the SAR raw data points. It should be understood that the value of the scaling factor and the translation vector may vary depending on the range and/or azimuth of the SAR raw data points.

The application of a scaling can be mathematically represented by the Equation 1:

$$ss(x,y)=A \cdot dd(x,y) \qquad \text{Eq. 1}$$

where ss(x, y), A, and dd(x, y) respectively represent the SAR scaled data, the scaling vector, and the SAR raw data.

In one embodiment, a scaling factor corresponding to a translation along the azimuth axis is applied to the SAR raw data. In this case, the value of the scaling factor may vary as a function of the position along the range axis for the SAR data points. In another embodiment, a scaling factor corresponding to a translation along the range axis is applied to the SAR raw data. In this case, the value of the scaling factor may vary as a function of the position along the azimuth axis for the SAR data points. In a further embodiment, a scaling vector corresponding to a translation along both the azimuth and range axes is applied to the SAR raw data. If the scaling factor has the same value for both the azimuth and range axes such that the same translation vector is applied along both the azimuth and range axes, applying a scaling vector can be thought of as a zoom-in or a zoom-out. Alternatively, the value of the scaling vector may be different for the azimuth and the range axes.

Figure 3A:
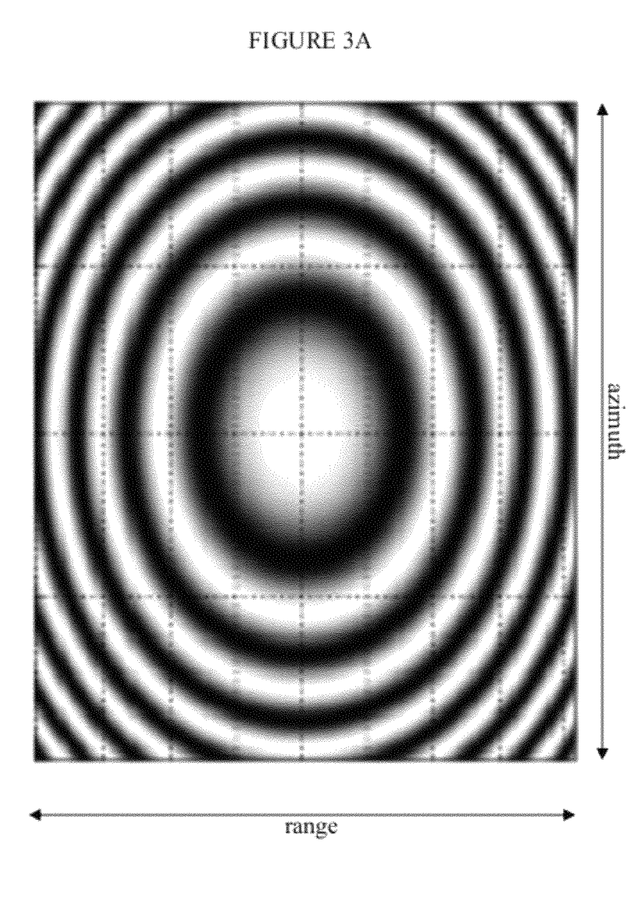
FIGS. 3A and 3B illustrate graphical representations of SAR raw data and SAR corrected data, respectively, in accordance with an embodiment.
Figure 3B:
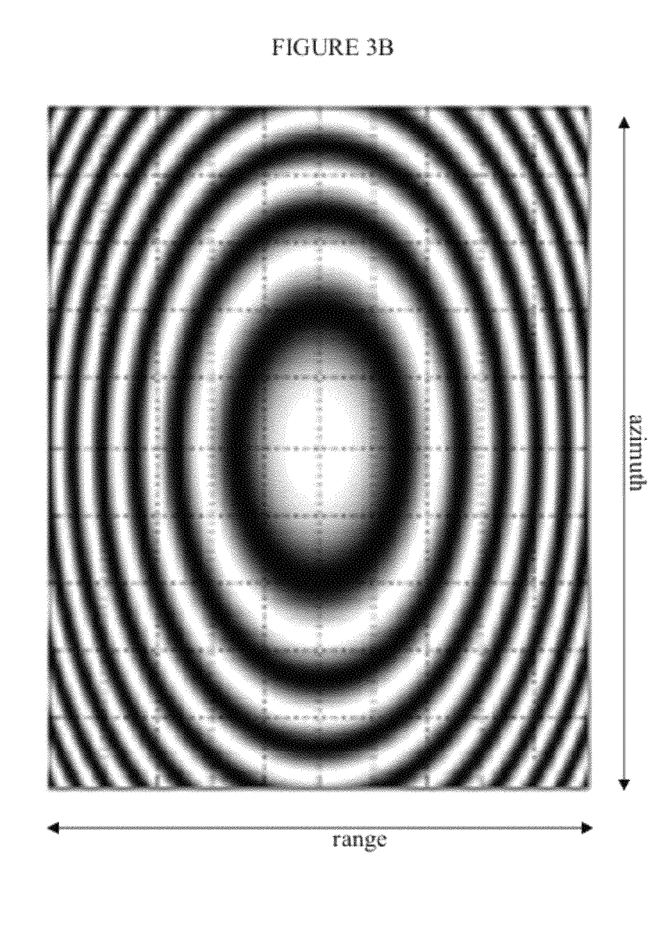

FIG. 3a illustrates one embodiment of a graphical representation of stripmap SAR raw data illustrative electromagnetic signals reflected by a target area to be imaged. The SAR raw data are graphically represented by a central disc and circles which are concentric with the central disc. The graphical representation of the SAR raw data can be thought of as an interference pattern in optics. Because a SAR parameter change causing a variation of the Fresnel zone plate focal length occurred before acquiring the SAR raw data illustrated in FIG. 3A, a correction of the SAR raw data is performed for compensating for the SAR parameter change. A scaling factor is determined in accordance with the SAR parameter change. In the present case, applying the scaling factor to the SAR raw data corresponds to applying a translation vector directed towards the center of the central disc to the central disc and the concentric circles. The value of the translation vector varies along the azimuth axis such that the central disc and the concentric circles are converted into ovals as illustrated in FIG. 3B.

In one embodiment, the variation of the interference pattern parameter, such as the Fresnel zone plate focal length for example, is first determined, and the value of the scaling factor is determined using the variation of the Fresnel zone plate focal length. In this case, the scaling factor in the azimuth and range axis is equal to the square root of the variation of the azimuth Fresnel zone plate focal length and the square root of the variation of the range Fresnel zone plate focal length, respectively.

In one embodiment, the scaling factor is determined in accordance with a database of empirical data previously stored in a memory. The empirical data contains scaling factor values as a function the SAR parameter change value. Alternatively, the database of empirical data comprises values of interference pattern parameter variations, such as Fresnel zone plate focal length variations or variations for the Fourier slice scaling parameter for example, as a function the SAR parameter change value and the scaling factor value is determined using the value for the Fresnel zone plate focal length variation.

In another embodiment, the scaling factor is determined from actual and nominal values for SAR parameters of the SAR system. A nominal SAR parameter value refers to the value that the corresponding SAR parameter should have according to the design of the SAR system. The scaling factor is calculated as the square root of the ratio of the current Fresnel zone plate focal length to the nominal Fresnel zone plate focal length. The scaling factor for the range and the azimuth direction is given by Equations 1 and 2, respectively:

$$ScalingFactor_{Range} = \sqrt{\frac{ChirpRate}{ChirpRateNominal} \cdot \frac{RangeSamplingFrequencyNominal}{RangeSamplingFrequency}} \qquad \text{Eq. 2}$$

$$ScalingFactor_{Azimuth} = \sqrt{\frac{SlantRangeNominal}{SlantRange(RangeSwathNumber)} \cdot \frac{PRFNominal}{PRF}} \qquad \text{Eq. 3}$$

where the Chirp Rate corresponds to the instantaneous rate of change of the frequency of the emitted signal, the Range Swath Number is the number of the range swath, and PRF is the pulse repetition frequency.

In another embodiment, the SAR parameter change received at step 24 causes a Doppler shift. Such a parameter change can be a change of the squint angle, a change of the eccentricity of the platform orbit, or the like. In one embodiment, SAR raw data can be represented by a complex function. In this case, step 26 of correcting the SAR raw data comprises determining a phase factor in accordance with the SAR parameter change and applying the phase factor to the complex function, thereby obtaining the corrected data. Alternatively, the Doppler shift induced by the SAR parameter change is determined and the phase factor is then determined using the Doppler shift. Any adequate method for determining the Doppler shift can be used. For example, if the SAR imaging system is provided with an adequate number of echo detectors, a Fourier transform of the SAR raw data may be performed. The Doppler shift can be determined from the Fourier transform by determining a shift of the center of the Fourier transform.

Applying the phase factor to the SAR raw data consists in multiplying the SAR raw data function ff(x, y) by an imaginary number exp[jφ], φ being the previously determined phase factor.

$$gg(x, y) = ff(x, y)\exp[j\varphi] \qquad \text{Eq. 4}$$
$$= |ff(x, y)|\exp[j\Phi\Phi(x, y)]\exp[j\varphi]$$
$$= |ff(x, y)|\exp[j(\Phi\Phi(x, y) + \varphi)]$$

where gg(x, y), |ff(x, y)|, and jΦΦ(x, y) respectively represent the SAR corrected data function, the amplitude function of the SAR raw data, and the phase function of the SAR raw data.

In another embodiment, the SAR raw data is graphically represented by a SAR pattern such as the SAR pattern illustrated in FIG. 3A. SAR raw data points forming the SAR pattern are organized in rows along the azimuth axis and in columns along the range axis. Each SAR raw data point is associated with an amplitude value and a phase value. In this case, step 26 of correcting the SAR raw data comprises determining an azimuth shift and shifting the columns of SAR raw data points in accordance with the determined azimuth shift. Alternatively, the Doppler shift induced by the SAR parameter change can be determined using any adequate method and the azimuth shift is determined using the Doppler shift. It should be understood that applying a linear phase vector to the complex function representing the SAR raw data is equivalent to applying an azimuth shift to a SAR pattern representing the SAR raw data.

In one embodiment, the scaling factor and/or the column shift and/or the phase factor are determined using a database of empirical data. The database contains values for the scaling factor and/or the column shift and/or the phase factor as a function of SAR parameter change values, interference pattern parameter change values, such as azimuth and/or range Fresnel zone plate focal length values or Fourier slice scaling parameter values for example, and/or Doppler shift values.

In one embodiment, the Doppler shift is determined using an estimated Doppler centroid value. An estimation for the Doppler centroid is given by Equation 5:

$$f_{DC} = \frac{U}{\lambda_{radar}} - \frac{2V_g \cdot \tan\theta_{sq}}{\lambda_{radar}} \qquad \text{Eq. 5}$$

where U is the planet's rotational velocity, $V_g$ is the satellite's projected ground velocity, $\lambda_{radar}$ is the radar wavelength, and $\theta_{sq}$ is the squint angle.

In one embodiment, step 28 of generating the SAR image using the corrected data comprises digitally generating the SAR image using the corrected digital data. Any adequate digital method for generating a SAR image using the corrected data can be used. Examples of adequate digital methods comprise the range/Doppler method, the wavenumber method, the chirp-scaling method, the plane-wave approximation method, and the like.

In another embodiment, step 28 of generating the SAR image using the corrected data comprises optically generating the SAR image using the corrected digital data. Any adequate optical methods for generating a SAR image using the corrected SAR data can be used. The SAR image is generated by creating an optical image of the SAR raw data and optically processing the image of the SAR raw data.

In one embodiment, the optical image of the SAR raw data is created using a light modulator such as a spatial light modulator (SLM) or a micro display. The light modulator comprises addressable pixels organized in rows along a first axis representing the azimuth and in columns along a second axis representing the range. The transmittance of each pixel of the light modulator is controlled in accordance with the amplitude and/or phase of the corresponding SAR corrected data value. A coherent light such as a laser light is generated and illuminates the light modulator. The incident laser light is modulated by the light modulator and an optical image of the SAR corrected data is generated at the output of the light modulator. The optical image of the SAR corrected data is then optically processed to reconstruct the SAR image of the target area. The reconstructed SAR image can be projected on a screen. Alternatively, an optical sensor such as a charge-coupled device (CCD) or a complementary metal-oxide-semiconductor (CMOS) sensor, for example, can be used to convert the optical SAR image of the target area into a digital SAR image of the target area which can be recorded in a memory or sent to a base station, for example.

In one embodiment, the SLM comprises two SLMs mapped one against the other. The transmittance of the pixels of the first SLM is set in accordance with the amplitude of the SAR raw data points and the transmittance of the pixels of the second SLM is set in accordance with the phase of the SAR raw data points, or vice versa.

Figure 4:
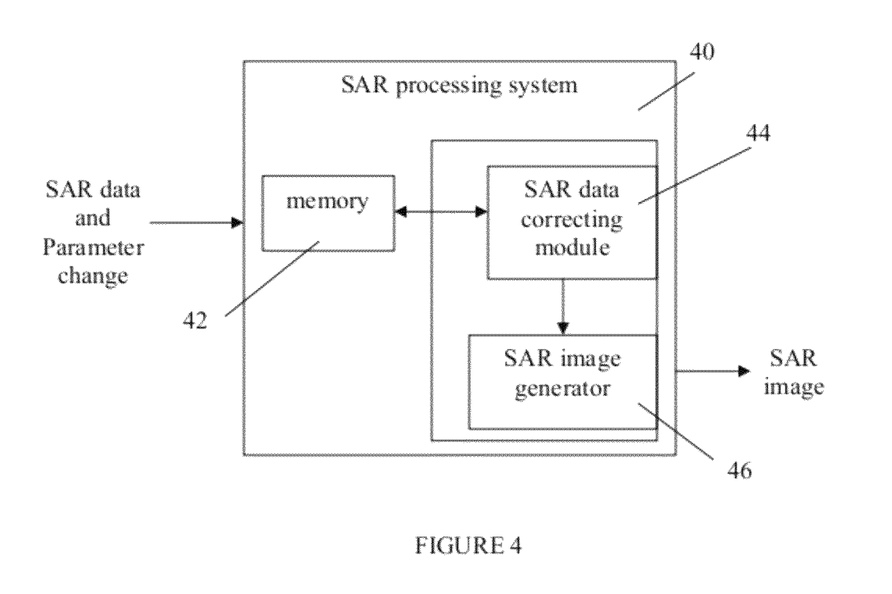
FIG. 4 is a block diagram illustrating a system for generating a SAR image in accordance with a SAR parameter change, in accordance with an embodiment.

FIG. 4 illustrates one embodiment of a SAR processing system 40 which comprises a memory 42, a SAR raw data correcting module 44, and a SAR image generator 46. The SAR processing system 40 is adapted to receive SAR raw data from the SAR imaging system and a parameter change for the SAR imaging system. The SAR raw data and the parameter change are stored in the memory 42. The SAR raw data correcting module 44 accesses the SAR raw data and the parameter change from the memory. The SAR raw data correcting module 44 is adapted to generate corrected SAR data in accordance with the method described above. The SAR corrected data are then transmitted to the SAR image generator 46 which is adapted to generate a SAR image using the SAR corrected data. Alternatively, the SAR corrected data is stored in the memory 42 and the SAR image generator 46 accesses the SAR corrected data from the memory 42.

In one embodiment, the SAR parameter change causes a variation of the interference pattern parameter, such as the Fresnel zone plate focal length or the Fourier slice scaling parameter for example. In this case, the SAR raw data correcting module 42 is adapted to determine a scaling factor in accordance the parameter change and apply the scaling factor to the SAR raw data in order to obtain the corrected SAR data. The scaling of the SAR raw data can be performed via memory addressing operations.

In another embodiment, the SAR parameter change causes a Doppler shift. In this case, the SAR raw data correcting module 42 is adapted to determine a phase factor and to apply the phase factor to the SAR raw data in accordance with the method described above.

Alternatively, the SAR raw data correcting module 42 can be adapted to generate a SAR digital pattern such as the one graphically represented in FIG. 3A using the received SAR raw data. The SAR raw data correcting module 42 is further adapted to determine an azimuth shift using the SAR parameter change or the Doppler shift in accordance with the methods described above. The SAR raw data correcting module 42 is also adapted to shift the columns of the SAR digital pattern in accordance with the determined azimuth shift in order to obtain a corrected SAR pattern corresponding to the SAR corrected data. In this case, the corrected SAR pattern is sent to an optical modulator comprising a light modulator and the transmittance of the light modulator is controlled in accordance with the corrected SAR pattern representing the SAR corrected data.

In one embodiment, the SAR raw data correcting module 44 is adapted to compensate for changes of SAR parameters which cause a variation of the interference pattern parameter and for changes of SAR parameters which cause a Doppler shift. In this case, the SAR raw data correcting module 42 is adapted to determine the adequate correcting method using the SAR parameter type.

In one embodiment, the memory 42 comprises a database of empirical data which contains values for the scaling factor, the phase factor, and/or the azimuth shift as a function of values of the SAR parameter change, the interference pattern parameter such as the Fresnel zone plate focal length or the Fourier slice scaling parameter for example, and/or the Doppler shift.

In one embodiment, the SAR raw data processing system 40 is adapted to receive a value for the SAR parameter and the SAR raw data correcting module 44 is adapted to determine the value of the SAR parameter change using the received value of the SAR parameter and a reference SAR parameter value.

In one embodiment, the SAR image generator 46 comprises a processing unit adapted to digitally generate a SAR image of the target area using the corrected SAR data. In this case, the processing unit is configured for applying the adequate methods for digitally creating a SAR image described above. It should be understood that, when the SAR image generator 46 is a digital image generator, the SAR data correcting module 44 and the SAR image generator 46 can be embodied in a single module 48 comprising at least one processing unit configured for correcting the SAR raw data and generate a SAR image of the corrected SAR data.

In another embodiment, the SAR image generator 46 comprises a coherent light source, a pixel drive unit, a light modulator such as an SLM or a micro display, and an optical processor. Any adequate light modulator can be used. For example, the light modulator can be a liquid crystal display, a micro mirror SLM, an electro-optic SLM, a magneto-optic SLM, or the like. The pixel drive unit is adapted to control the transmittance of each addressable pixel of the light modulator. The pixel drive unit receives the corrected data in the form of a complex function or a SAR pattern from the SAR raw data correcting module 44 or the memory 42, and sets the transmittance of the addressable pixels of the light modulator in accordance with the SAR corrected data. The coherent light source emits a coherent light beam which illuminates the light modulator. The coherent light incident to the light modulator is modulated in accordance with the transmittance of the pixels and a modulated light corresponding to an image of the SAR corrected data is transmitted at the output of the light modulator. The modulated light then propagates through the optical processor which generates a reconstructed and corrected image of the target area. The image can be displayed on a screen. The SAR image generator can also be provided with an optical detector or sensor, such as a CCD or a CMOS sensor, for converting the optical reconstructed image of the target area into a digital image which can be saved in memory 42.

In one embodiment, the coherent light source comprises a spatial filter to improve the quality of the image. A polarizer may be provided between the light modulator and the coherent light source if the light modulator requires polarized light.

In one embodiment, the optical processor comprises at least one cylindrical lens to selectively focalize the azimuth or range field. The cylindrical lens can be used together with a spherical lens to provide focusing power in the azimuth or range direction. The cylindrical lens may also compensate for a chirp along the range direction and/or for a range phase factor along the azimuth direction.

In one embodiment in which the SAR image generator comprises a light detector, the optical processor can comprise at least one spherical lens for imaging the processed wave to the detector plane of the light detector.

While the present description refers to the compensation of a variation of Frensel zone plate focal length for a stripmap SAR and the compensation of a variation of Fourier slice scale parameter for a spotlight SAR, it should be understood that the method and apparatus described above can be used for compensating for a variation of any interference pattern parameter for any types of SAR.

It should be understood that the method 20 and the system 40 can be used with interferometric SARs and non-interferometric SARs.

While the present description refers to a synthetic aperture radar, it should be understood that the methods, apparatuses, and systems described above can be applied to any adequate synthetic aperture imaging system. For example, the method 20 and the apparatus 40 can be used with a synthetic aperture SONAR (SAS), a synthetic aperture LIDAR, a synthetic aperture terahertz system, a synthetic aperture infrared system, or the like.

It should be noted that the present invention can be carried out as a method or can be embodied in a system or an apparatus. The embodiments of the invention described above are intended to be exemplary only. The scope of the invention is therefore intended to be limited solely by the scope of the appended claims.

The invention claimed is:

1. A method for processing data generated by a synthetic aperture imaging system, comprising:
   receiving raw data representative of electromagnetic signals reflected by a target area to be imaged;
   receiving a parameter change causing a variation of an interference pattern parameter for said synthetic aperture imaging system, said interference pattern parameter being one of a Fresnel zone plate focal length and a Fourier slice scaling parameter;
   using a processing unit, digitally correcting said raw data in accordance with said parameter change, said correcting comprising determining a scaling factor using said parameter change and scaling said raw data in accordance with said scaling factor, thereby compensating for said parameter change in order to obtain corrected data; and
   generating an image of said target area using said corrected data, said generating comprising:
      generating an incident light;
      modulating said incident light in accordance with said corrected data, thereby obtaining a modulated light; and
      optically processing said modulated light, thereby obtaining an optical image of said target area.

2. The method as claimed in claim 1, further comprising detecting said optical image to obtain a digital image of said target area.

3. The method as claimed in claim 1, wherein said parameter change comprises a change of one of a pulse repetition frequency, a range sampling frequency, and a slant range distance.

4. The method as claimed in claim 1, wherein said receiving said raw data comprises receiving said raw data from one of a synthetic aperture radar system, a synthetic aperture lidar system, a synthetic aperture terahertz system, and a synthetic aperture infrared system.

5. A system for generating a synthetic aperture image of a target area, comprising:
   a memory configured to store raw data representative of electromagnetic signals reflected by said target area and a parameter change causing a variation of an interference pattern parameter for said synthetic aperture imaging system, said interference pattern parameter comprising one of a Fresnel zone plate focal length and a Fourier slice scaling parameter;
   a processing unit configured to determining a scaling factor using said parameter change and scaling said raw data in accordance with said scaling factor in order to compensate for said parameter change and obtain corrected data; and
   an image generator configured to generate an image of said target area using said corrected data, said image generator comprising:
      a light source configured to generate incident light;
      a light modulator configured to moderate said incident light in accordance with said corrected data, thereby obtaining a modulated light; and
      an optical processor configured to optically process said modulated light, thereby obtaining said image of said target area.

6. The system as claimed in claim 5, wherein said image generator further comprises an image sensor for detecting said optical image and generating a digital image of said target area.

7. The system as claimed in claim 5, wherein said parameter change comprises a change of one of a pulse repetition frequency, a range sampling frequency, and a slant range distance.

8. The system as claimed in claim 5, wherein said memory is configured to store said raw data generated by one of a synthetic aperture radar system, a synthetic aperture lidar system, a synthetic aperture terahertz system, and a synthetic aperture infrared system.

* * * * *